C. J. JACKSON.
CUSHION WHEEL.
APPLICATION FILED MAR. 23, 1917.
1,381,996.
Patented June 21, 1921.
2 SHEETS—SHEET 1.
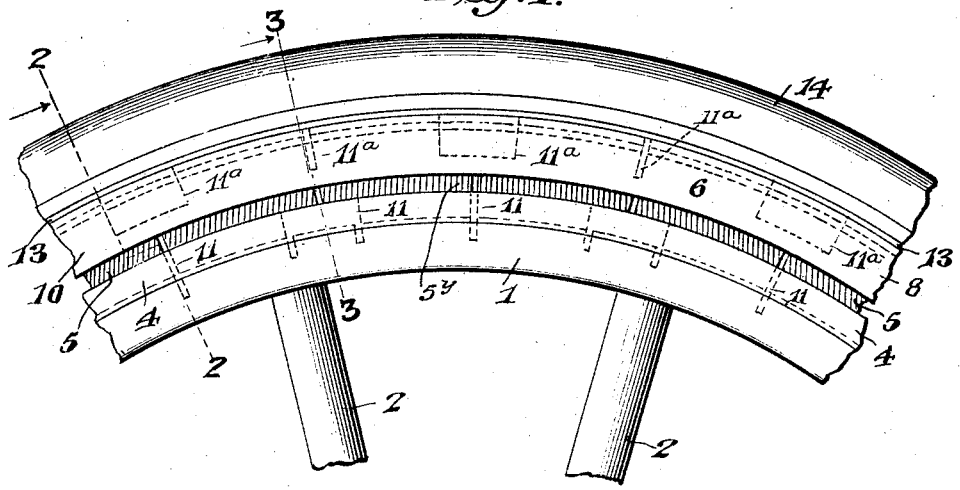
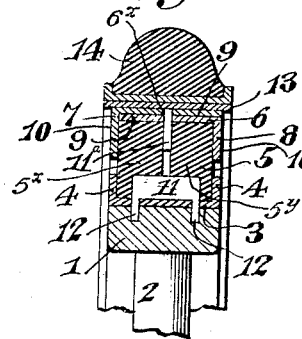 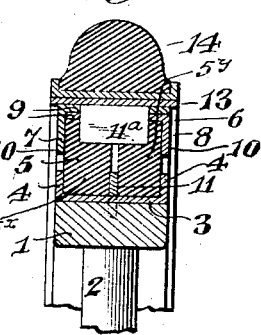 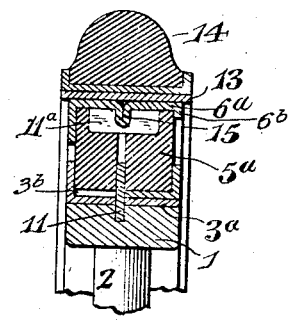
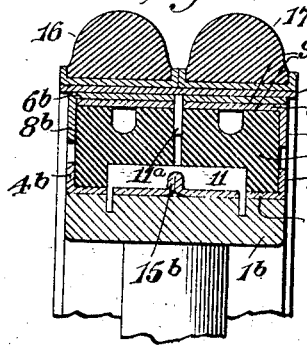 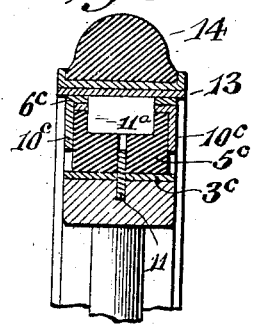 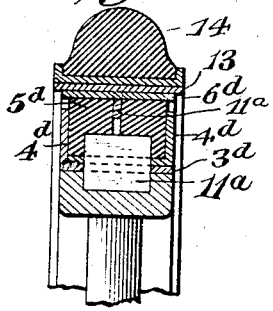
WITNESSES
Jas. E. M'Cathran
Chas. H. Kesler
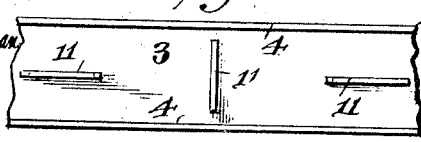
INVENTOR
Charles J. Jackson,
By E. G. Siggers
ATTORNEY

C. J. JACKSON.
CUSHION WHEEL.
APPLICATION FILED MAR. 23, 1917.

1,381,996.

Patented June 21, 1921.
2 SHEETS—SHEET 2.

UNITED STATES PATENT OFFICE.

CHARLES J. JACKSON, OF GALVA, ILLINOIS.

CUSHION-WHEEL.

1,381,996. Specification of Letters Patent. Patented June 21, 1921.

Application filed March 23, 1917. Serial No. 157,007.

*To all whom it may concern:*

Be it known that I, CHARLES J. JACKSON, a citizen of the United States, residing at Galva, in the county of Henry and State of Illinois, have invented a new and useful Cushion-Wheel, of which the following is a specification.

This invention relates to cushion wheels.

The object of the invention is to construct a solid rubber tire as a substitute for a pneumatic tire, in which the rubber cushion will be made in short sections, divided both longitudinally and transversely of the wheel, said sections being firmly secured in place and held from lateral and longitudinal displacement.

In the accompanying drawings I have illustrated a few of the forms in which my invention is capable of being embodied.

Figure 1 is a fragmentary side elevation of a wheel illustrating the application of the invention thereto.

Fig. 2 is a transverse sectional view on the line 2—2 of Fig. 1, looking in the direction of the arrow.

Fig. 3 is a transverse sectional view on the line 3—3 of Fig. 1, looking in the direction of the arrow.

Figs. 4 to 7 inclusive are similar transverse sectional views illustrating modified forms of the invention.

Fig. 8 is a fragmentary plan view of one of the annular members, showing the arrangement of locking plates thereon.

Figs. 9 and 10 are transverse sectional views through a wheel showing the application of my invention to metallic fellies having wire spokes.

Fig. 11 is a transverse sectional view on the line 11—11 of Fig. 12, looking in the direction of the arrow and illustrating a further form of the invention.

Fig. 12 is a fragmentary side elevation of a wheel embodying the form of the invention illustrated in Fig. 11.

Fig. 13 is a detail plan view illustrating one form of locking plate and spacing plate.

Fig. 14 is a detail sectional view illustrating a modified form of locking plate.

Fig. 15 is a plan view of the construction shown in Fig. 14.

Fig. 16 is a detail view illustrating a locking plate showing a slightly modified form of lug.

Fig. 17 is a detail view showing the relation of the locking plate of Fig. 13 to its spacing plate.

Figs. 18 and 19 are views illustrating several ways in which the locking plate of Fig. 14 and its spacing plate may be joined.

Fig. 20 is a plan view illustrating a further modified form of spacing plate and lock.

Fig. 21 is a vertical section of the same.

Figs. 22 and 23 are detail sectional views, illustrating a further modified form of the invention.

Referring to Figs. 1, 2 and 3, I have there shown the wheel having a felly 1 and spokes 2, which in the constructions here shown are preferably of wood. Fixed to the felly 1 is a one piece member or channel ring 3 having side flanges 4. A sectional cushion 5 of suitable resilient material such as rubber is mounted within the channel ring 3. An outer member or channel ring 6 surrounds the rubber cushion, and, as here shown, is in two angular sections or parts 7 and 8 having overlapping transverse flanges 9 and side flanges 10 engaging the sides of the cushion.

Locking plates 11, or as illustrated in Fig. 7, 11$^a$, are provided for connecting the inner channel ring to the felly and locking plates 11$^a$ are provided for connecting the parts or sections of the outer channel ring together. These plates project into the body of the rubber cushion and serve as a bank or anchoring devices therefor. As shown in Fig. 1, in dotted lines, the plates 11$^a$ of the outer channel ring are arranged alternately longitudinally and transversely around the wheel. The same arrangement is provided upon the inner channel ring and as shown the transversely extending plates of one ring are arranged in radial alinement with the longitudinally extending plates of the other ring.

As shown in Fig. 2, the plates 11 are provided with stems 12, which may be either square or round and fit in openings or slots in the transverse portions of the members or rings 3. The plates 11 and 11$^a$ are preferably cut from flat pieces of steel or are of cast or malleable iron.

The cushion 5 comprises a plurality of sections 5$^x$ and 5$^y$ arranged transversely in pairs and extending circumferentially around the wheel. In assembling the wheel, the channel member 3 is secured to the felly 1 by means of the plates 11. The sections 5ˣ and 5ʸ are then placed within the channel member 3 upon opposite sides of the longitudinally extending plates 11ᵃ and between the transversely extending plates 11 of the lower channel member. The parts 7 and 8 are then mounted upon the cushion one at a time with their transverse flanges in overlapping position, as shown in Fig. 2. The plates 11ᵃ are then driven through the slots 6ˣ in the transverse flanges of the parts 7 and 8 to secure them together. The circumferentially extending plates 11ᵃ project between the transversely arranged sections 5ˣ and 5ʸ and the transversely extending plates 11ᵃ will project between the ends of adjacent circumferentially extending sections.

Mounted outside of and encircling the outer channel member 6 is a standard band 13, which may be used or not, as desired. Surrounding the band 13 is a regular solid rubber, pneumatic, or other tire 14. The construction above described is one which has been found to be very durable and one which does not impair the resiliency of the wheel. The plates 11 or 11ᵃ perform the dual function of locking the several parts of the channel rings together and to the felly and of serving as a bank for the cushion.

In Fig. 4, I have illustrated a slightly modified form of the invention in which the inner channel member 3ᵃ is in two parts like the construction of the outer channel member 6 in the form shown in Figs. 2 and 3. The outer channel member 6ᵃ of the form shown in Fig. 4 is provided with an integral rib 15 which extends circumferentially therearound and is located at the longitudinal meeting line of the sections of the rubber cushion 5ᵃ. This rib takes the place of the longitudinally arranged plates 11ᵃ of the outer member described in connection with Figs. 1, 2 and 3. The parts of the inner channel member 3ᵃ are locked together by longitudinally extending and transversely extending locking plates 11ᵃ. The transverse plates for the inner channel member, however, are not shown, but the arrangement of the plates is the same as that in the figures first described. The outer channel member 6ᵃ is also provided with transversely arranged plates 11ᵃ. It is to be understood, however, that both of the channel members of the wheel may be of the two part construction described or both may be of the one piece construction according to the conditions and requirements.

The cushion 5ᵃ shown in Fig. 4 is divided transversely into sections which are in turn centrally divided circumferentially to form two parts 5ˣ, 5ʸ to each section as in the previously described forms, and the plates 11 and 11ᵃ respectively of the inner and outer channel members are adapted to fit in the spaces between the various sections thus formed.

In assembling the construction shown in Fig. 4, the inner ring of the channel member 3ᵃ is first secured permanently upon the felly 1, the left hand sections of the cushion 5ᵃ (as viewed in Fig. 4) are then placed in position in the outer channel member 6ᵃ, with the transverse locking plates 11ᵃ thereof between the ends of the said circumferential sections, and the longitudinally disposed plates 11 to lie between the two transverse section of 5ᵃ.

The outer channel member 6ᵃ with the left hand part of the cushion 5ᵃ and the plates 11ᵃ therein, is then placed over the inner ring of the member 3ᵃ which is secured to the felly 1. The longitudinal and transverse locking plates 11 of the inner member 3ᵃ are then placed in the seats provided for them in the inner ring of the member 3ᵃ and the felly 1. It will be seen that the radial thickness of the sections of the cushion 5ᵃ is substantially equal to the space between the inner circumferential face of the outer channel ring 6ᵃ and the outer circumferential face of the inner ring of the member 3ᵃ, and that the inturned flange 6ᵇ of the ring is substantially equal in length to the thickness of the outer ring of the member, 3ᵃ.

It is then possible to place the right hand sections of the cushion 5ᵃ in position upon the outer circumferential face of the inner ring of the member 3ᵃ, when their outer circumferential faces will easily pass within the inner edge of the inturned flange 6ᵇ on the right side of the ring 6ᵃ (in Fig. 4), and lastly, the outer ring of the member 3ᵃ, having suitable slots 3ᵇ provided therein for the reception of the several securing pins or legs forming part of the plates 11 and 11ᵃ, is slipped in place upon the inner ring and forces the sections of the cushion 5ᵃ outwardly and within the flanges of the outer ring 6ᵃ when they are securely held in place, the frictional engagement between the rings of the member 3ᵃ being sufficient to prevent their disengagement.

The outer channel ring having the tire 14 therein and also the band 13 may now be applied and secured, or the same may have been previously positioned.

In Fig. 5, I have shown the application of my invention to a double tire construction. In this figure, a felly 1ᵇ is provided having fixed thereto an inner channel ring 3ᵇ provided with outturned flanges 4ᵇ and a longitudinally extending rib 15ᵇ. Mounted within the channel ring 3ᵇ is the cushion 5ᵇ formed as in the other constructions of a plurality of sections. The cushion is inclosed by the outer channel ring 6ᵇ. This ring is in two sections 7<sup>b</sup> and 8<sup>b</sup> having overlapping transverse flanges 9<sup>b</sup> which are locked together by means of the longitudinally extending plates 11<sup>a</sup>. Transverse plates are not shown but are to be used as in the form first described. Longitudinally extending plates, however, have not been provided for the inner channel ring inasmuch as the rib 15<sup>b</sup> takes the place thereof. The inner ring, however is fixed to the felly by means of a transversely extending plate 11. The plates and rib are located at the longitudinal and transverse meeting lines of the sections of the cushion. Surrounding the sectional channel member 6<sup>b</sup> is the usual band 13<sup>b</sup> to the outside of which are fixed a pair of tires 16 and 17.

In Fig. 6, the inner member or ring 3<sup>c</sup> is not channeled as in the forms above described, but an outer sectional channel ring 6<sup>c</sup> is provided with vertically extending flanges 10<sup>c</sup> which are much wider than the flanges above described, and extend nearly to the member 3<sup>c</sup>. Interposed between the rings 3<sup>c</sup> and 6<sup>c</sup> is a cushion 5<sup>c</sup>. Locking plates 11 lock the ring 3<sup>c</sup> to the felly while similar plates 11<sup>a</sup> lock the sections of the outer ring together. Both the outer and inner plates are mounted in the cushion for the purpose specified. In other respects the construction shown in Fig. 6 is the same as the previously described constructions.

In the construction shown in Fig. 7, the outer member or ring 6<sup>d</sup> is devoid of flanges, while the inner channel ring 3<sup>d</sup> has extra wide flanges 4<sup>d</sup> approaching very closely the outer ring. The locking plates 11<sup>a</sup> in this case connect the parts of the inner channel member together and to the felly and are arranged in the cushion 5<sup>d</sup>. The construction in other respects is the same as above described.

Referring to Fig. 9, I have there shown a construction comprising an inner channel member or ring 3<sup>e</sup> to which wire spokes 18 are directly connected and which constitutes a metallic felly. The inner channel member 3<sup>e</sup> is provided with a central rib 15<sup>e</sup> extending longitudinally around the wheel and fitted in the cushion 5<sup>e</sup>. The cushion 5<sup>e</sup> is surrounded by a channel ring 6<sup>e</sup> of a construction similar to that shown in Figs. 2 and 3. The channel rings have fastened thereto the plates 11<sup>a</sup> disposed in the cushion in the manner above described.

In the construction shown in Fig. 10, a metallic felly 1<sup>f</sup> is provided having wire spokes 2<sup>f</sup>. Attached to this felly is an inner channel member or ring 3<sup>f</sup> having the cushion 5<sup>f</sup> mounted therein with the outer channel member 6<sup>f</sup> inclosing the cushion. Arranged in the cushion and attached to the channel members or rings are the locking plates 11<sup>a</sup>.

In the forms above described and illustrated in Figs. 4 to 7, 9 and 10, the plates 11 or 11<sup>a</sup> except as modified by the ribs 15, etc., are arranged in the manner illustrated in Figs. 1 to 3 and are of the same construction as there illustrated.

In Figs. 11 and 12, I have illustrated a form of the invention which may be the preferred one. In the construction there shown a felly 20 is provided having attached thereto an inner channel member or ring 21 comprising angular sections or parts 22 and 23 having the transverse flanges 24 and 25 arranged side by side with each other and spaced apart as shown in Fig. 11. A similar outer channel or ring member 26 is provided comprising angular sections 27 and 28 which are arranged like the sections of the inner channel ring or member. Interposed between these rings or members and between the lateral flanges 29 and 30 thereof is a rubber cushion 31.

In order to lock the sections of the channel rings or members against separation I have provided locking plates of various kinds. A plate 32 embodying one form is clearly shown at the upper part of Fig. 11 and in Fig. 13. This plate is provided upon one end of one edge with a beveled lug 33 and with a round or square lug 34 at the other end of the edge. The lug 34 fits or is riveted within the opening 35 in one section of the channel member, while the beveled lug 33 is adapted to be inserted into and wedged within the slot 36 of the other section of the channel member whereby the two sections are wedged together against separation. As shown at the upper part of Fig. 11 and in Fig. 13, the plate 32 is arranged radially of the wheel at right angles to the channel ring and is fitted in the cushion sections 31.

Another form of locking plate is illustrated at the lower part of Fig. 11 and in Figs. 14 and 15 and indicated at 32<sup>a</sup>. In the construction here shown the lugs 33<sup>a</sup> and 34<sup>a</sup> instead of being arranged upon the edge as in the construction shown in Fig. 13 are arranged upon the flat side of the plate. In other respects the construction is the same. As shown in Fig. 16, the beveled lug may also be provided with an additional bevel as shown at 37 whereby the plates 32—32<sup>a</sup> may be easily disengaged from the sections.

As shown in Figs. 11 and 12, the locking plate 32 is upon the outer channel member, while the locking plate 32<sup>a</sup> is used upon the inner channel member, the plates of one member being staggered with relation to the plates of the other member. These plates may be used in different arrangements, however, and either separately or together, according to conditions.

As shown in Figs. 11, 13, 14 and 15, the sections of each channel ring are separated by means of vertical spacing plates 38 arranged longitudinally around the wheel and projecting between the sections to hold them in separated position. The spacing plates intersect the plane of the locking plates 32 or 32ª and are slightly modified in order that they may be properly positioned according to which form of locking plate they intersect.

When the spacing plate 38 is used with the locking plate 32 shown at the upper part of Fig. 11, the two plates cross each other and are arranged at right angles, as shown in Figs. 11, 12, 13 and 17. In order to allow this crossing or intersection of the plates, the plate 32 at the edge adjacent to its ring is provided with a recess or notch 39, while the plate 38 is provided with a corresponding recess or notch 40 at the edge remote from its ring one plate fitting in the notch of the other plate, substantially as shown.

Where the locking plate 32ª shown in Fig. 14, however, is used, the spacing plate is either of the construction shown in Fig. 18, or Fig. 19. As shown in Fig. 18, the spacing plate is provided with a slot 41 through which the locking plate 32ª extends, the slot being sufficiently large to permit the lugs 32ª and 34ª to pass therethrough. In the construction shown in Fig. 19, the slot 41ª of the spacing plate is open at the top as shown at 42 in order to allow the lugs of the locking plate 32ª to disengage the spacing plate. The spacing plates being arranged vertically and extending longitudinally are located between the sections of the cushion interposed between the channel members or rings, while the plates 32 being arranged radially are likewise located between the sections of the cushion and extend transversely thereof whereby these plates serve to bank the cushion. It should also be noticed that the locking plates also serve to lock the spacing plates in position against both longitudinal and radial movement with reference to the wheel.

As in the previously described forms, the cushion 31, shown in Fig. 11 is also arranged in circumferential and transverse sections.

In assembling this form the left hand pieces or blocks of the cushion 31 (as viewed in said figure) may be first placed within the angular sections 23 and 28 of the inner and outer channel rings, respectively, the inner angular section having been previously secured to the felly 20. The right hand pieces or blocks of the cushion 31 are arranged within the angular sections 22 and 27 of the inner and outer channel rings respectively with the locking plates 32 and 32ª secured to the latter, the plates 32 located between the pieces or blocks while the spacing plates 38, which are suitably notched to assume the relation to the transverse locking plates 32 and 32ª shown in Figs. 11 and 17, are then positioned on the plates 32 and 32ª and the entire right hand side of the cushion, thus described, is forced into locking engagement with the left hand side thereof, the resiliency of the plates 32 and 32ª permitting the lugs 33 and 33ª to advance and enter their respective seats.

In certain instances, it may be advisable to combine the locking plate and the spacing plate in one integral construction and in Figs. 20 and 21 I have shown such a construction. I have there shown, however, only one of the channel rings, but either or both of the channel rings above described and illustrated in Fig. 11 may be supplied with the combined spacer and locking plate. A channel ring 43 comprises sections 44 and 45 having transverse flanges 46 and 47 arranged in line and separated by the slot 48. The transverse flange of one section is provided with a slot 49 and the other transverse flange with an opening 50. The combined locking plate and spacer 51 comprises a longitudinally extending medial portion 52 and transversely extending radial end portions 53 and 54 together simulating substantially the letter Z. The end portion 53 is provided with a lug 55 adapted to engage the hole 50 while the portion 54 is provided with a corresponding beveled lug 56 adapted to be wedged in the slot 49. The outer edge 57 of the central portion 52, it will be noticed from an inspection of Fig. 21 extends beyond the corresponding edges of the end portions 53 and 54 and projects into the slot 48 to keep the sections spaced apart. The portions will be arranged in the cushion as in the forms above described.

In Figs. 22 and 23, I have shown a simple T piece 58 which constitutes a substitute for the channel rings or members of the various forms above illustrated. This T piece comprises the annular portion 59 and the longitudinally extending central annular rib 60 which is adapted to be fitted within the resilient cushion or rubber interposed between the T pieces. A plate 61 extends transversely of the T piece and is attached thereto by means of the lugs 62 at the ends thereof, the lugs enter openings 63 within the portion 59. One edge of the plate and the edge of the rib 60 are provided with notches 64 and 65, whereby the plate and rib are interfitted with the inner edges of the rib and plate intersecting each other. The plate adds to the stability of the T.

The cushion may be of a solid construction or provided with holes and grooves, as shown in Fig. 5, to increase the resiliency thereof.

The plates or anchoring devices 11 or 11ª in addition to performing the function of locking the several sections of the rings together are also arranged longitudinally and transversely of the wheel in order to serve as a bank or as anchoring devices to prevent circumferential or lengthwise creeping of the cushion with reference to the rings and also to prevent lateral movements thereof.

In the construction shown in Figs. 11 and 12, the locking plates 32 also constitute anchoring devices which prevent the circumferential creeping of the cushion with relation to the rings thereof. The spacing plates 38 are likewise fitted within the cushion and extend longitudinally and prevent the lateral displacement or movement of the cushion.

What is claimed is:—

1. In a cushion wheel, inner and outer rings, one of which comprises angular sections having overlapping transverse flanges, a sectional cushion interposed between said rings, and a series of anchoring plates arranged alternately longitudinally and transversely of the sectional ring and disposed in said cushion between the sections thereof, said plates having locking engagement with said flanges and spacing apart the sections of the cushion both longitudinally and transversely.

2. In a cushion wheel, inner and outer rings, one of which comprises angular sections, a cushion interposed between the same, and transversely disposed locking plates provided with lugs engaging openings in the sections for locking the same.

3. In a cushion wheel, a pair of rings, one of which comprises angular sections, a cushion interposed between said rings, and locking plates provided with lugs engaging openings in the sections for locking the sections together.

4. In a cushion wheel, inner and outer rings, one of which comprises angular sections having overlapping transverse flanges with openings, a sectional cushion interposed between said rings, and transversely extending locking plates having engaging portions entering the openings of said sections for connecting and locking the sections together.

5. In a cushion wheel, inner and outer sectional channel members, a cushion interposed between said members, plates provided with lugs for locking the sections together, and spacing plates arranged at right angles to the first-mentioned plates and projecting between the sections.

6. In a cushion wheel, inner and outer sectional channel members, a cushion interposed between said members, a tire encircling the outer of said members, and plates having lugs at the opposite ends thereof for connecting the sections of each member together, one of said lugs being adapted to be inserted within the opening of one section and the other lug being beveled whereby it engages the opposite section with wedging effect to draw the sections together.

7. In a cushion wheel, a pair of sectional channel members, a cushion interposed between said members, a tire upon the outer of said members, means for locking said members together comprising a plate having lugs at its opposite ends, one of said lugs being beveled, and a spacing plate arranged at right angles to the locking plate, having an interlocking engagement therewith, fitted in said cushion and interposed between said sections.

8. In a cushion wheel, inner and outer rings, one of said rings comprising angular sections having transverse flanges, and both of said rings having side flanges, the corresponding side flanges of said rings lying in the same vertical plane, a sectional cushion interposed between the side flanges of said rings, and longitudinally and transversely arranged plates disposed in said cushion between the rings and spaced apart, both rings being retained in place by said plates.

In testimony that I claim the foregoing as my own, I have hereto affixed my signature in the presence of two witnesses.

CHARLES J. JACKSON.

Witnesses:
MARSHALL MILLS,
DON ROTHGEB.